United States Patent
Bertosa et al.

(10) Patent No.: US 9,208,627 B2
(45) Date of Patent: Dec. 8, 2015

(54) SCAN TOOL WITH INTEGRATED GLOBAL POSITIONING SYSTEM

(75) Inventors: Thomas Bertosa, Chardon, OH (US);
Michael Gessner, Akron, OH (US);
Hamid Namaky, South Russell, OH (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 1104 days.

(21) Appl. No.: 11/704,977

(22) Filed: Feb. 12, 2007

(65) Prior Publication Data

US 2008/0195271 A1     Aug. 14, 2008

(51) Int. Cl.
*G06F 19/00*     (2011.01)
*G06F 7/00*     (2006.01)
*G07C 5/08*     (2006.01)

(52) U.S. Cl.
CPC .......... *G07C 5/0808* (2013.01); *G01S 2205/002* (2013.01); *G07C 2205/02* (2013.01)

(58) Field of Classification Search
CPC .............. G07C 5/0808; G07C 2205/02; G01S 2205/002
USPC ................ 701/29, 213, 220, 31.4, 31.5, 32.3, 701/32.4, 32.7, 43.3, 34.4, 454, 468
See application file for complete search history.

(56) References Cited

U.S. PATENT DOCUMENTS

| | | | |
|---|---|---|---|
| 6,850,188 B1 | 2/2005 | Lee et al. | |
| 6,928,349 B1 | 8/2005 | Namaky et al. | |
| 7,225,065 B1 * | 5/2007 | Hunt et al. | 701/29 |
| 2003/0050038 A1 * | 3/2003 | Haave et al. | 455/404 |
| 2004/0227523 A1 * | 11/2004 | Namaky | 324/537 |
| 2006/0098403 A1 * | 5/2006 | Smith | 361/683 |
| 2007/0024117 A1 * | 2/2007 | Boenker et al. | 307/9.1 |
| 2007/0027627 A1 * | 2/2007 | Lawrence et al. | 701/213 |
| 2007/0069947 A1 * | 3/2007 | Banet et al. | 342/357.09 |

* cited by examiner

*Primary Examiner* — Redhwan k Mawari
*Assistant Examiner* — Rodney P King
(74) *Attorney, Agent, or Firm* — Baker & Hostetler LLP

(57) ABSTRACT

A diagnostic tool and method are provided wherein the diagnostic tool includes a global positioning system. The diagnostic tool can provide diagnostic data, global position and altitude to the user. The diagnostic tool can alert the user or the owner if the tool determines that it has been removed from a predefined area. The tool retrieves data from the determined altitude so that the vehicle can be serviced for optimal operations at that altitude.

24 Claims, 2 Drawing Sheets

SCAN TOOL WITH INTEGRATED GLOBAL POSITIONING SYSTEM

FIELD OF THE INVENTION

The present invention relates generally to an automotive diagnostic tool. More particularly, the present invention relates to an automotive diagnostic tool having an integrated global positioning system ("GPS") and/or altimeter.

BACKGROUND OF THE INVENTION

Modern vehicles typically have one or more diagnostic systems, generally having separate computer control modules to control various functions of the vehicle. Some examples include powertrain control module (PCM), engine control module (ECM), a transmission control module (TCM), anti-locking brake system (ABS), and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool, such as a scan tool. The scan tool must, therefore, be connected to the vehicle's computer bus system via a data link connector (DLC) to access and retrieve the DTCs. Scan tools are testing devices that interface with vehicle diagnostic systems to retrieve information from the various control modules. The scan tools are equipped to communicate in various communication protocols such as Controller Area Network (CAN), J1850 VPM and PWM, ISO 9141, Keyword 2000 and others. These communications protocols may be specific to the various automobile manufacturers. The scan tool will help the technician to diagnose and repair the vehicle based on the information the tool retrieves from it.

Unfortunately, the vehicle's diagnostic systems are not designed to know certain conditions of the vehicle when an issue arises. For example, a customer may complain that his vehicle intermittently loses power when climbing an inclined road, such as a hill or a mountain. However, the vehicle's diagnostic system can not provide the information as to the location and altitude when this intermittent issue occurs. The mechanic can use a conventional scan tool to help him diagnose the issue but can not verify the repair has been completed properly as he does not know at exactly what altitude and location the issue occurs.

Accordingly, it is desirable to provide a method and apparatus that allow a diagnostic tool to perform both diagnostic and ascertain the altitude and location when a problem occurs.

SUMMARY OF THE INVENTION

The foregoing needs are met, to a great extent, by the present invention, wherein in one aspect an apparatus is provided that in some embodiments allows a diagnostic tool to determine its attitude and location.

In accordance with one embodiment of the present invention, a diagnostic tool for diagnosing a vehicle is provided, which can comprise of a processor that operates a software having a database, a memory that stores the software operated by the processor, a connector interface that connects the diagnostic tool to a data link connector in the vehicle, a signal translator that allows the diagnostic tool to communicate with the vehicle in at least one communication protocol, an input device for inputting information into the diagnostic tool, a display that displays information to a user, a global positioning system receiver coupled to the processor, and a housing surrounding the processor, the memory, the connector interface, the signal translator, the input device, the display and the global positioning system receiver.

In accordance with another embodiment of the present invention, a method of operating a diagnostic tool for a vehicle is provided, which can comprise of linking the diagnostic tool with a vehicle's diagnostic computer via the vehicle's data link connector, communicating with the vehicle's diagnostic computer in a communication protocol, retrieving diagnostic data from the vehicle's diagnostic computer, and determining an altitude of the vehicle with the diagnostic tool having a global positioning system receiver.

In accordance with yet another embodiment of the present invention, a diagnostic tool for a vehicle is provided, which can comprise of a means for processing that operates a software having a database, a means for storing that stores the software operated by the means for processing, a means for connecting that connects the diagnostic tool to a data link connector in the vehicle, a means for translating that allows the diagnostic tool to communicate with the vehicle in at least one communication protocol, a means for inputting that allows a user to input information into the diagnostic tool, a means for displaying that displays information to the user, a means for determining a global position coupled to the means for processing, and a means for housing surrounding the means for processing, the means for storing, the means for connecting, the means for translating, the means for inputting, the means for displaying and the means for determining the global position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
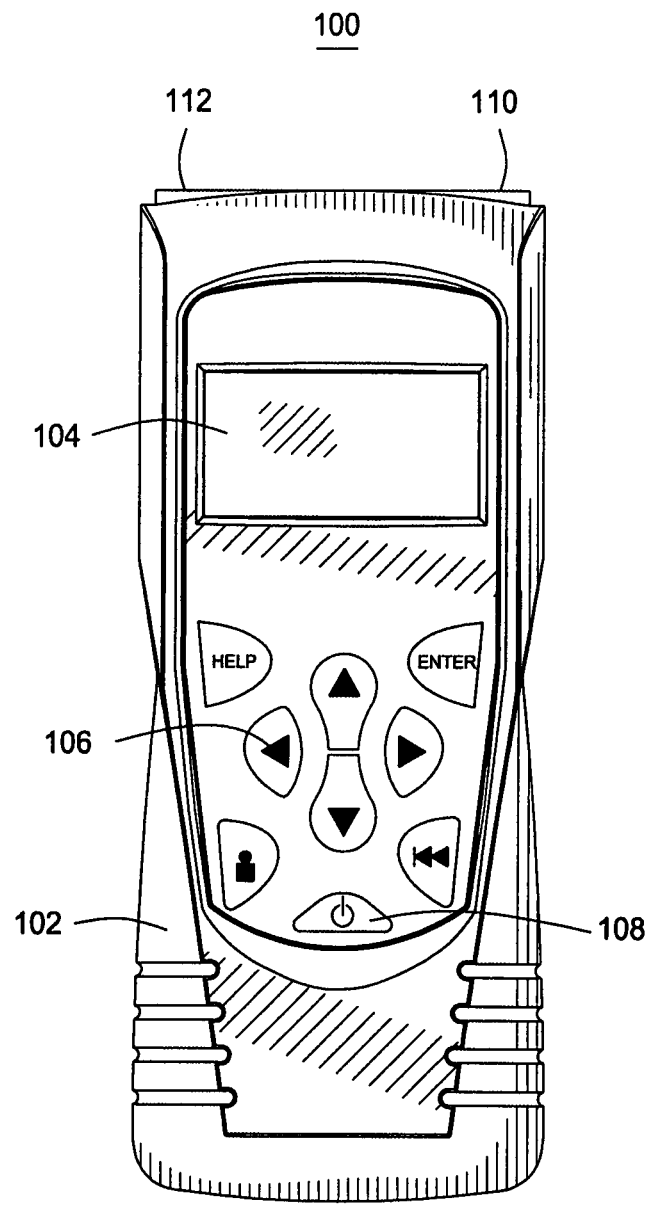
FIG. 1 is a front view illustrating a diagnostic tool according to an embodiment of the invention.

The invention will now be described with reference to the drawing figures, in which like reference numerals refer to like parts throughout. An embodiment in accordance with the present invention provides an apparatus, such as a scan tool and method that can conduct diagnostic testing of the vehicle and determine the location and the altitude of the vehicle. In another embodiment, an apparatus, such as a scan tool and method are provided that allow a user to locate the scan tool or be alerted if the scan tool leaves a predefined area.

An embodiment of the present inventive apparatus is illustrated in FIG. 1. In particular, FIG. 1 is a front view illustrating a diagnostic tool 100 according to an embodiment of the invention. The diagnostic tool 100 can be any computing device, such as, for example, the Nemisys diagnostic tool from Service Solutions (a unit of the SPX Corporation) in Owatonna, Minn. or Elite Autoscanner® Pro CP9190 from Actron also a unit of Service Solutions. The diagnostic tool 100 includes a housing 102 to house the various components of the diagnostic tool, such as a display 104, a user interface 106, a power key 108, a memory card reader 110 (optional) and a connector interface 112. The display 104 can be any display, for example, LCD (liquid crystal display), VGA (video graphics array), touch display (can also be a user interface), etc. The user interface 106 allows the user to interact with the diagnostic tool in order to operate the diagnostic tool as desired. The user interface 106 can include function keys, arrow keys or any other type of keys that can manipulate the diagnostic tool 100 in order to operate various menus that are presented on the display. The input device 106 can also be a mouse or any other suitable input device, including a keypad. The user interface 106 can also include numbers or be alphanumeric. The power key 108 allows the user to turn the diagnostic tool 100 on and off, as required.

Memory card reader 110 can be a single type card reader, such as a compact flash card, floppy disc, memory stick, secure digital, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc.

The connector interface 112 allows the diagnostic tool 100 to connect to an external device, such as an ECU of a vehicle, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
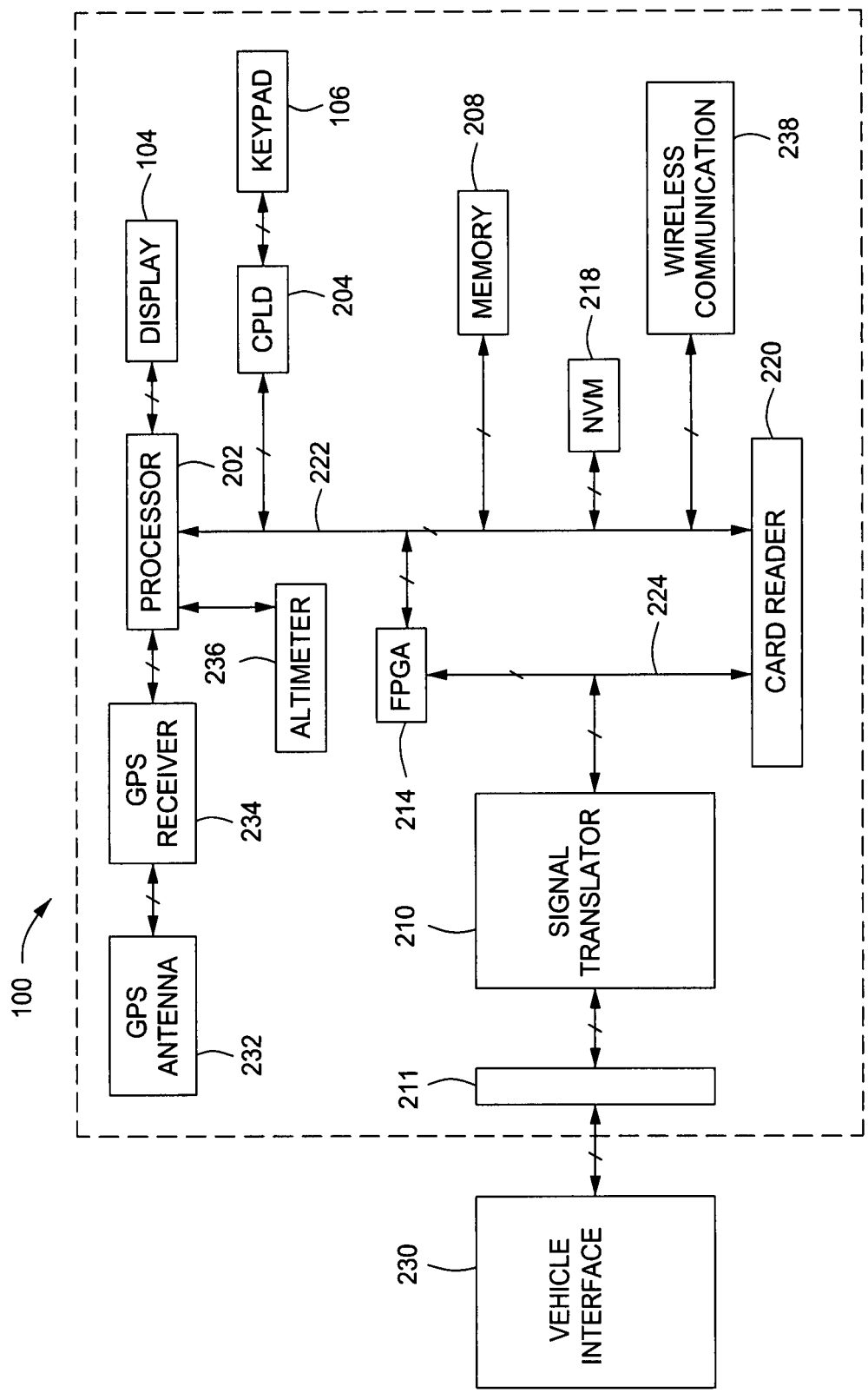
FIG. 2 is a block diagram of the components of a diagnostic tool according to an embodiment of the invention.

FIG. 2 is a block diagram of the components of the diagnostic tool 100. In FIG. 2, the diagnostic tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, a selectable signal translator 210, a GPS antenna 232, a GPS receiver 234, an optional altimeter 236 and a wireless communication circuitry 238. A vehicle communication interface 230 is in communication with the diagnostic tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with diagnostic tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, a solenoid drive, J1708, RS232, Controller Area Network (CAN), Keyword 2000 (ISO 14230-4), OBD II or other communication protocols that are implemented in a vehicle.

The circuitry to translate and send in a particular communication protocol can be selected by FPGA 214 (e.g., by tri-stating unused transceivers) or by providing a keying device that plugs into the connector interface 211 that is provided by diagnostic tool 100 to connect diagnostic tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of diagnostic tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the diagnostic tool 100 can be stored in the memory subsystem 208, including any database. The database can include data for tuning or servicing a vehicle at various altitudes or regions. Because vehicles run differently (for example, oxygen levels vary at different altitudes) at different altitudes or regions, moving a vehicle (such as a racing vehicle) from one altitude to another or from one region (hot) to another region (cold) will require tuning the vehicle to that changed altitude and/or region as discussed below. The database can also be stored on an external memory, such as a compact flash card or other memories.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 102, external to the unit, or any combination thereof. The GPS antenna 232 electronically couples to the GPS receiver 234 and allows the GPS receiver to communicate (detects and decodes signals) with various satellites that orbit the Earth. The GPS receiver 234 electronically couples to the processor 202, which is coupled to memory 208, NVM 218 or a memory card in the card reader 220. The memory can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user.

The GPS receiver must communicate with and "lock on" to a certain number of satellites in order to have a "fix" on its global location. Once the location is fixed, the GPS receiver with the help of the processor can determine the exact location including longitude, latitude, altitude, velocity of movement and other navigational data.

Should GPS receiver be unable to lock onto the required number of satellites to determine the altitude or unable to determine the altitude for any reason, the altimeter 236 can be used to determine the altitude of the diagnostic tool 100. The altimeter 236 is electronically coupled to the processor 202 and can provide the altitude or elevation of the diagnostic tool. The altimeter can be coupled to a barometric pressure sensor (not shown) in order to calibrate the elevation measurements determined by the altimeter. The sensor can be positioned interior or exterior to the housing of the diagnostic tool. Minor atmospheric pressure changes can affect the accuracy of the altimeter, thus, diagnostic tool can correct for these changes by using the sensor in conjunction with the altimeter along with a correction factor.

Wireless communication circuit 238 communicates with the processor via second bus system 222. The wireless communication circuit can be configured to communicate to satellites, cellular phones (analog or digital), Bluetooth®, Wi-Fi, Infrared, Local Area Networks or other wireless communication. The wireless communication circuit allows the diagnostic tool to communicate with other devices wirelessly.

In operation, a vehicle owner complains to the mechanic that the vehicle intermittently loses power at a certain altitude. The mechanic can couple the diagnostic tool 100 to the vehicle's ECU's and conduct a test drive to duplicate the intermittent power loss. The diagnostic tool 100 can perform the diagnostic during the test drive and provide live data to the mechanic. Additionally, because the diagnostic tool also includes the GPS and/or the altimeter, the scan tool can provide the location of the vehicle, including its altitude. By looking at the scan tool (live data and altitude information), the mechanic knows if the vehicle is under the same conditions described by the owner or close to it as possible. Alternatively, the mechanic can record the live diagnostic data along with the location/altitude of the vehicle for later retrieval. Thus, when the mechanic is able to reproduce the power loss at a certain altitude, he has a "snapshot" of the pertinent data of the power loss and will be able to analyze the intermittent problem.

With the diagnostic tool having GPS and/or altimeter, the mechanic can verify the owner's complaint. Additionally, after the mechanic fixes what he believes to be the issue in the vehicle, he can verify the repair by driving the vehicle to the same altitude to see if a power loss takes place.

In another embodiment, the diagnostic tool having an integrated GPS system allows the owner of the diagnostic tool to keep track of the tool. Often times, owners of auto parts store may lend their diagnostic tools to their customers to use in the parking lot in order to retrieve the DTCs that have been set in the vehicle. However, the customer may forget to return it or attempt to steal it. The diagnostic tool can be programmed so that once the tool determines that is has left a predetermined area, such as the property lines of the store, it can alert the owner by sending a wireless signal to the store via the wireless communication circuitry 238. Once the owner receives the signal (containing an identifying information of the tool), he knows which one of his diagnostic tools is missing and he can determine who had rented it out (through rental records such as a driver license information or other contact information such as home address and phone number) and contact the customer in order for the customer to return it. Alternatively, the diagnostic tool can emit a sound, such as a high pitch noise, to indicate that it has left the property lines of the store. This sound can continue until the customer returns the diagnostic tool to the store or be within the predetermined area. The sound will remind the customer that he still has the diagnostic tool in his possession and that he needs to return it to the store in order for the sound to stop.

In yet another embodiment, the diagnostic tool can simply automatically lock down and no longer function when the tool determines that it is no longer within the predefined area of the store. In order to be unlocked, the owner's password must be entered in order to operate the tool again. This embodiment will help to deter the stealing of the diagnostic tool.

These embodiments help the owner of the diagnostic tools keep track of them and to remind the customer to return the tool once the tool is removed from the predefined area. Once the tool is returned to the predefined areas, the tool can function again automatically or by entering a password or other security features known in the art.

In another embodiment, the diagnostic tool can retrieve tuning or servicing information that is altitude dependent. This will be useful for vehicles that are used for professional racing. For example, racing vehicles are often moved from one altitude to another depending on the location of the races. Moving from one altitude (low) to another altitude (high) and/or from one region (dry) to another region (wet) may affect how a high performance race vehicle will perform. Thus, it is important to have the race vehicle to be properly tuned for the altitude and/or region of the race track.

Once the vehicle arrives at the race track, the mechanic can use the diagnostic tool and determine the location (including region) and altitude of the racetrack. Once the diagnostic tool determines the location and altitude, then the mechanic can access the data for tuning or servicing the vehicle at that region and/or altitude for optimal performance. Alternatively, the diagnostic tool can automatically provide the necessary servicing and tuning data once the location and altitude of the diagnostic tool are determined.

Because the mechanic can determine the location (including the region) and the altitude of the race track and vehicle, he can properly service and tune the race vehicle for optimal performance. The data provided can be serving and/or tuning depending on what the mechanic needs.

The above described method is done in the tool via software, however, hardware or hardware and software combination to carry out the method is also contemplated. All the steps described here do not have to be performed in order, variations of the order of the steps are also contemplated.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for diagnosing a vehicle, comprising:
a processor that operates a software having a database;
a memory that stores the software operated by the processor;
a connector interface that connects the diagnostic tool to a data link connector in the vehicle;
a signal translator that allows the diagnostic tool to communicate with the vehicle in at least one communication protocol;
an input device for inputting information into the diagnostic tool;
a display that displays information to a user;
a global positioning system receiver coupled to the processor; and
a housing surrounding the processor, the memory, the connector interface, the signal translator, the input device, the display and the global positioning system receiver;
wherein the global positioning system is configured to communicate a geographic location to the processor; and,
wherein the tool is configured to obtain data which is related to performance of the vehicle at the geographic location for servicing and tuning the vehicle and configured to provide access to the data by the user related to performance of the vehicle at the geographic location for optimal performance servicing and tuning of the vehicle based on at least one of a region and an altitude associated with the geographic location.

2. The diagnostic tool of claim 1 further comprising an altimeter coupled to the processor, wherein the altimeter provides an altitude of the diagnostic tool.

3. The diagnostic tool of claim 1 further comprising a global positioning system antenna coupled to the global positioning system receiver, wherein the global positioning receiver and the global positioning antenna provide a global position of the diagnostic tool.

4. The diagnostic code of claim 1, wherein the global positioning system receiver interacts with satellites and provides a location and altitude of the diagnostic tool.

5. The diagnostic tool of claim 2, wherein the database contains altitude related data for servicing the vehicle.

6. The diagnostic tool of claim 1 further comprising a wireless communication circuitry.

7. The diagnostic tool of claim 6, wherein the diagnostic tool is programmed to wirelessly alert a person when the tool is moved from a predefined location.

8. The diagnostic tool of claim 2, wherein the tool provides both diagnostic information and the altitude of the vehicle to the user.

9. The diagnostic tool of claim 4, wherein when the altitude of the tool is known, the processor automatically retrieves from the database data related to that altitude so that the user can service the vehicle for that altitude.

10. A method of operating a diagnostic tool for a vehicle, comprising:
linking the diagnostic tool with a vehicle's diagnostic computer via the vehicle's data link connector;
communicating with the vehicle's diagnostic computer in a communication protocol;
retrieving diagnostic data from the vehicle's diagnostic computer;
determining an altitude and a geographic location of the vehicle with the diagnostic tool having a global positioning system receiver such that the global positioning receiver is configured to communicate the altitude and the geographic location of the vehicle to the diagnostic tool for servicing the vehicle based on an altitude and a geographic location of the vehicle;
obtaining data from a database for data which is related to performance of the vehicle at the geographic location for servicing and tuning the vehicle; and
providing to the user the data related to performance of the vehicle at the geographic location for optimal performance servicing and tuning of the vehicle based on at least one of a region and an altitude associated with the geographic location.

11. The method of claim 10 further comprising alerting the user when the diagnostic tool is removed from a predefined area.

12. The method of claim 10 further comprising alerting a remote device via a wireless communication circuitry when the diagnostic tool is removed from a predefined area.

13. The method of claim 12, wherein the tool determines via the global positioning system receiver when it is removed from the predefined area.

14. The method of claim 10 further comprising retrieving altitude related data based on the altitude determined by the diagnostic tool so that the user can service the vehicle for that altitude.

15. The method of claim 10 further comprising:
determining the location of the diagnostic tool with the global positioning system receiver; and
displaying the location, the altitude and diagnostic data via a display on the diagnostic tool.

16. A diagnostic tool for a vehicle, comprising:
a means for processing that operates a software having a database;
a means for storing that stores the software operated by the means for processing;
a means for connecting that connects the diagnostic tool to a data link connector in the vehicle;
a means for translating that allows the diagnostic tool to communicate with the vehicle in at least one communication protocol;
a means for inputting that allows a user to input information into the diagnostic tool;
a means for displaying that displays information to the user;
a means for determining a global position coupled to the means for processing; and
a means for housing surrounding the means for processing, the means for storing, the means for connecting, the means for translating, the means for inputting, the means for displaying and the means for determining the global position;
wherein the means for determining the global position is configured to communicate a geographic location to the means for processing; and,
wherein the diagnostic tool is configured to retrieve data which is related to performance of the vehicle at the geographic location for servicing and tuning the vehicle and configured to provide access to the data related to performance of the vehicle at the geographic location for optimal performance servicing and tuning of the vehicle based on at least one of a region and an altitude associated with the geographic location to the user.

17. The diagnostic tool of claim 16 further comprising a means for determining an altitude coupled to the means for processing, wherein the means for determining the altitude provides an altitude of the diagnostic tool.

18. The diagnostic tool of claim 16 further comprising a global positioning system antenna coupled to the means for determining the global position, wherein the means for determining the global position and the global positioning antenna provide a global position of the diagnostic tool.

19. The diagnostic tool of claim 16, wherein the means for determining the global position interacts with satellites and provides a location and altitude of the diagnostic tool.

20. The diagnostic tool of claim 16, wherein the database contains altitude related data for servicing the vehicle.

21. The diagnostic tool of claim 16 further comprising a means for wireless communication.

22. The diagnostic tool of claim 16, wherein the diagnostic tool is programmed to wireless alert a person when the tool is moved from a predefined location.

23. The diagnostic tool of claim 16, wherein the tool provides both diagnostic information and the altitude of the vehicle to the user.

24. The diagnostic tool of claim 16, wherein when the altitude of the tool is known, the means for processing automatically retrieves from the database data related to that altitude.

* * * * *